May 26, 1925.
E. ZBINDEN
1,539,007
INTERNAL COMBUSTION ENGINE LOCOMOTIVE
Filed Dec. 5, 1924
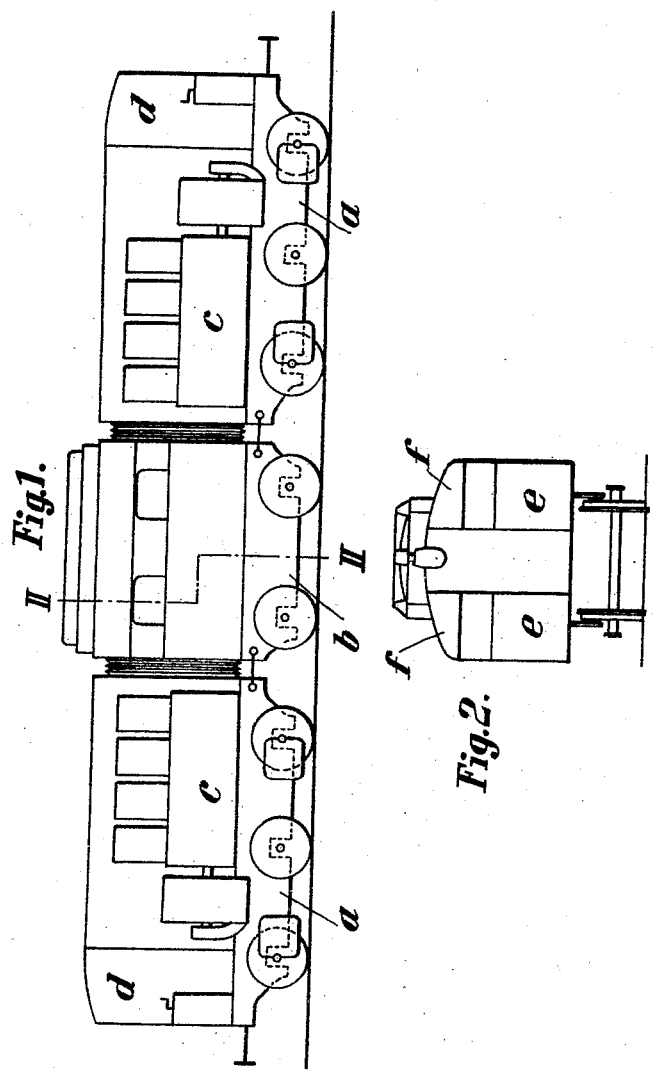

Patented May 26, 1925.

1,539,007

UNITED STATES PATENT OFFICE.

EUGEN ZBINDEN, OF BERN, SWITZERLAND, ASSIGNOR TO SULZER FRERES SOCIETE ANONYME, A CORPORATION OF SWITZERLAND.

INTERNAL-COMBUSTION-ENGINE LOCOMOTIVE.

Application filed December 5, 1924. Serial No. 754,034.

*To all whom it may concern:*

Be it known that I, EUGEN ZBINDEN, a citizen of Switzerland, residing at Bern, Switzerland, Beundenfeldstrasse, have invented certain new and useful Improvements in Internal-Combustion-Engine Locomotives, of which the following is a specification.

This invention relates to locomotives propelled by internal combustion engines of the kind comprising two or more internal combustion engines each mounted upon a separate truck or vehicle frame.

The object of the invention is to provide a locomotive of this type which, though possessing a tender carrying the water cooling plant and fuel supply tanks, obviates the need of a turntable at a terminus and further renders it unnecessary to change the relative positions of the tender and engine units.

To this end according to this invention the one or more units constituting the tender are arranged centrally between the vehicle units which carry the internal combustion engines and a driving cab is provided at the extreme end of the multiple unit locomotive thus composed.

A construction according to the invention is diagrammatically illustrated by way of example in the accompanying drawing, in which—

Figure 1 is a side elevation, and

Figure 2 a section on line II—II of Figure 1.

In the construction shown the two end trucks or vehicle units *a* are each provided with an internal combustion engine, and the tender *b* which carries the fuel tank, cooling installation and like auxiliary apparatus is in the form of an independent vehicle and arranged between the engine-carrying trucks to which it is coupled in any known manner. Each engine unit vehicle carries an internal combustion engine *c* having a driver's cab *d* at its outer end. The tender is furnished with fuel tanks *e* and also with the tanks *f* for the water cooling installation, the particular arrangement of these tanks being capable of variation to suit requirements. For specially large locomotives, several engine vehicle units may be used in place of the two shown and similarly two or more tender units may be arranged between the engine vehicle units or chassis.

What I claim as my invention and desire to secure by Letters Patent is:—

1. In an internal combustion engine locomotive the combination of at least two vehicle units, an internal combustion engine carried on each of said units, a separate vehicle unit arranged centrally between said engine-carrying units and constituting a tender therefor and couplings between said engine and tender units.

2. In a multiple unit internal combustion locomotive the combination of at least two vehicle units, an internal combustion engine carried by each of said units, a separate vehicle unit arranged centrally between said engine-carrying units and constituting a tender therefor, tanks for fuel and water on said tender unit, couplings between all the vehicle units and a driver's cab at the ends of the multiple unit vehicle so formed.

In testimony whereof I have affixed my signature in presence of two witnesses.

EUGEN ZBINDEN.

Witnesses:
H. W. HENSON,
OTTOKA WODICKE.